MULTIAPERTURE CRYOGENIC STORAGE CELL

Filed March 10, 1967

Inventors:
Vernon L. Newhouse;
Joseph L. Mundy,
by Marvin Snyder
Their Attorney.

Cell Operating Range, with Leg 14 Continuously Superconducting

Inventors:
Vernon L. Newhouse;
Joseph L. Mundy,
by Marvin Snyder
Their Attorney.

Cell Current Waveforms

Inventors:
Vernon L. Newhouse;
Joseph L. Mundy,
by Marvin Snyder
Their Attorney.

United States Patent Office 3,480,920

Patented Nov. 25, 1969

3,480,920

MULTIAPERTURE CRYOGENIC STORAGE CELL

Vernon L. Newhouse, Scotia, and Joseph L. Mundy, Schenectady, N.Y., assignors to General Electric Company, a corporation of New York Filed Mar. 10, 1967, Ser. No. 622,229
Int. Cl. G11q *11/44*
U.S. Cl. 340—173.1 17 Claims

ABSTRACT OF THE DISCLOSURE

A persistent current cryogenic storage cell, for use in a bit-organized memory matrix, comprising a Y-line layer of tin or indium on an insulated, permanently superconducting ground plane, crossed by a permanently superconducting lead X-line. Persistent current can circulate through two additional legs in parallel with the Y-line leg, thus providing storage. Any cell can be interrogated, or its contents changed, by driving current through both the X and Y lines of the cell so as to inject Y current into the storage loop. The cell is read by destroying the stored current.

Background of the invention

This invention relates to cryogenic storage cells, and more particularly to cryogenic storage cells having a pair of minor legs, through which a persistent current circulates, in parallel with a major leg, with one of the minor legs having a substantially greater value of critical current than the other.

Cryogenic storage cells generally provide storage facility through retention of a persistent circulating current. Cells for performing this function are well-known in the art and are described, for example, in Newhouse et al. Ser. No. 600,895, original application filed Jan. 28, 1966 and assigned to the instant assignee. However, for cryogenic storage cells which are desirably simple in configuration and yet useful in a bit organized array, such as continuous film memory cells, the operating current range is restricted since such cells require passage of current simultaneously through two separate current paths in order to produce an output. Thus, such cells require sufficient total current through both current paths to make the cell go normal or resistive, but current through either one of the paths which is insufficient, of itself, to make the cell go normal or resistive. This imposes a severe limitation on the operating range of this type of cell. Moreover, continuous film memory cells are susceptible to half-select disturb processes and occasionally go normal unexpectedly when in the half-select condition. While problems of this type have been overcome by devising cells which are more complex in structure and hence more difficult and costly to fabricate, there has heretofore existed a need for cryogenic storage cells of large operating range which are immune to half-select disturbances, and which are simple in configuration so as to permit easy and inexpensive fabrication thereof. The present invention concerns a cryogenic storage cell of the latter type.

Summary of the invention

Accordingly, one object of this invention is to provide a persistent current cryogenic storage cell having an operating range which may be made indefinitely large merely by increasing cell dimensions.

Another object is to provide a simplified cryogenic storage cell which is completely immune to half-select disturbances.

Another object is to provide a cryogenic cell for indefinite retention of a persistent circulating current, which may be easily fabricated.

Briefly, in accordance with a preferred embodiment of the invention, a cryogenic storage cell is provided comprising a major path and two minor paths of soft superconductive material. The minor paths are directed in parallel with the major path and connected thereto through a pair of common linking paths comprised of the soft superconductive material. A path of hard superconductive material is directed so as to cross over the major path at substantially a right angle thereto. The path of hard superconductive material is relatively narrow where it crosses over the major path and relatively wide elsewhere, so as to facilitate establishment of a stronger magnetic field through the soft superconductive material at the crossover of the major path than at any other location. Insulating means are provided to space the path of hard superconductive material from the path of soft superconductive material so as to keep the two paths electrically isolated from each other.

Brief description of the drawings

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

Description of the preferred embodiments

Figure 1:
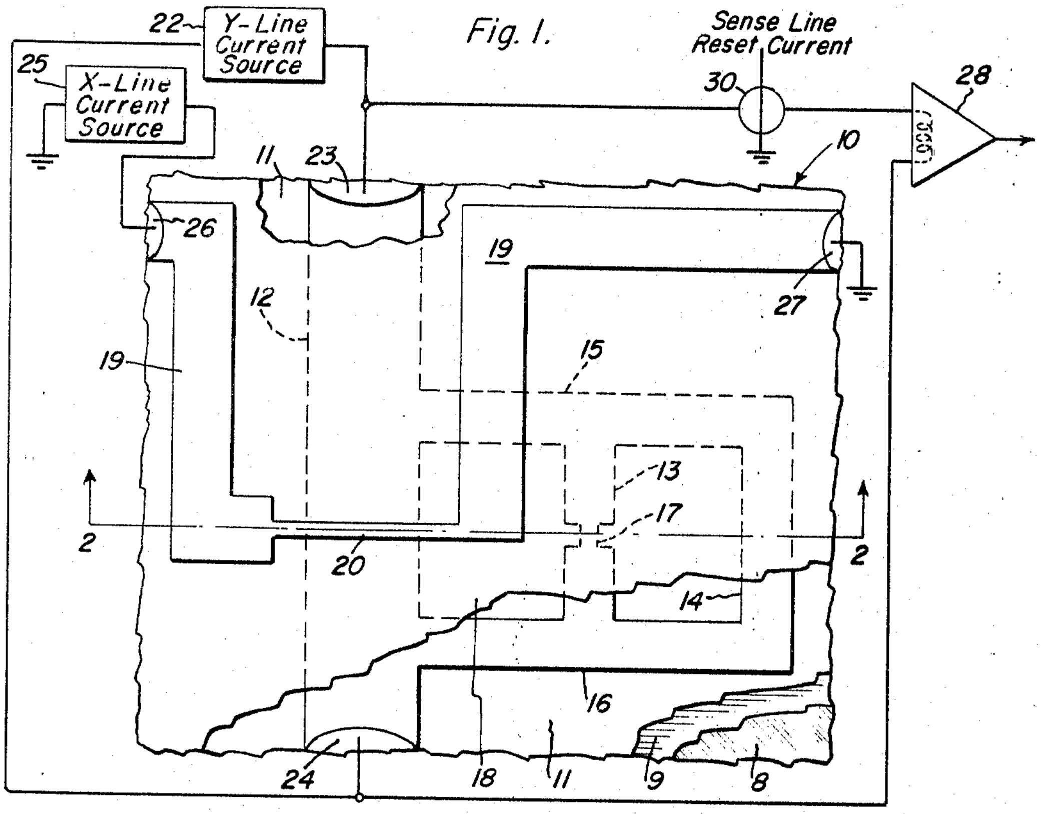
FIGURE 1 is a top view illustration of one cell of the present invention, showing circuit means for operating the cell.

FIGURE 1 is a schematic illustration of a multi-aperture cryogenic storage cell 10 constructed in accordance with the instant invention and connected in a circuit for illustrating performance of storage and readout functions. A soft superconductor, such as tin or indium, preferably tin, is deposited in the form of parallel paths comprising a major path 12 and two minor paths 13 and 14 which are connected to path 12 through a pair of common linking paths 15 and 16, on a film of insulation 11, such as silicon oxide, niobium oxide or photoresist. Leg 13 is constricted in region 17 so as to restrict the critical current value of leg 13; that is, the constriction limits the maximum current which can be carried by leg 13 without resulting in an increase of resistance thereof from its essentially zero value. However, since a narrow film has a relatively high inductance, constriction 17 is made as short as possible in order to keep the inductance of leg 13 from becoming substantially greater than leg 14. Leg 12, which is switched between normal and superconducting states, is fabricated with sufficient width to exhibit a relatively low value of inductance and thereby insure that while leg 12 is in the superconducting state, very little current is injected into cell 10.

A second layer of insulation 18 is deposited over the soft superconductor paths, at least over leg 12 and path 15, to insulate the soft superconductor from a path 19 of hard superconductor material, such as lead, having a narrow portion 20 crossing over leg 12 at substantially a right angle thereto. Path 19 also crosses over linking path 15, and is shaped so that region 20 of the hard superconductor crossing over leg 12 is narrower than the region crossing over linking path 15; hence, magnetic flux density due to current within superconductor 19 is considerably greater at the crossover of leg 12 than at the crossover of linking path 15. Alternatively, path 19 may cross legs 13 and 14 if preferred, by enlarging the width of path 19 in this region so as to maintain flux density in legs 13 and 14 at a very low value. This type of cell is outlined schematically in FIGURE 4 wherein like numerals indicate like components, showing how region 20 of the hard superconductor material flares out in a region 29 overlying legs 13 and 14 of the soft superconductor material.

In FIGURE 1, a columnar or Y-line current source 22 is connected to leg 12 by, for example, soldered connections 23 and 24 at either end thereof. Similarly, a row or X-line current source 25 is connected to superconductor 19 by, for example, soldered connections 26 and 27 at either end thereof. A current sensing cryogenic readout amplifier 28, which has a superconducting input and hence a purely inductive input impedance, is connected across leg 12 in series with a reset cryotron 30 which, when operated in conjunction with readout apparatus as described in the aforementioned Newhouse et al. application Ser. No. 600,895, completes the sensing circuit connected to the input of amplifier 28 only when cell 10 is to be read out.

Figure 2:
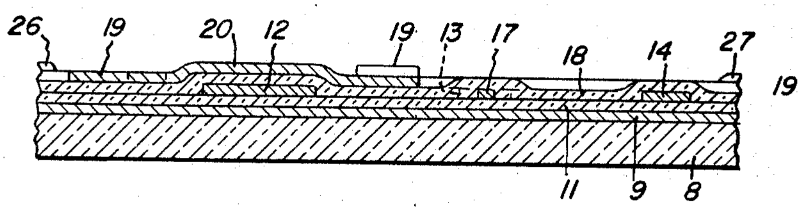
FIGURE 2 is a sectional view of the single cell of FIGURE 1, taken along line 2—2.

FIGURE 2 is a sectional view of the cell of FIGURE 1 taken along line 2—2, showing the vertical relationships of the various cell layers to each other. Thus, a superconductive shield or ground plane 9 may be deposited on an insulating substrate 8, such as glass. This ground plane is fabricated of a thin film of hard superconductive material, such as lead or niobium, and serves to reduce inductance of the memory cell circuitry so as to greatly increase cell operating speed. The base layer of insulation 11 is deposited on ground plane 9, and the soft superconductive paths 12–17 are thereafter deposited on insulation 11. Insulation 18 is shown separating hard superconductor 19 from the various paths of the soft superconductive material. If desired, the entire cell may be coated with a layer of insulation (not shown).

Figure 3:
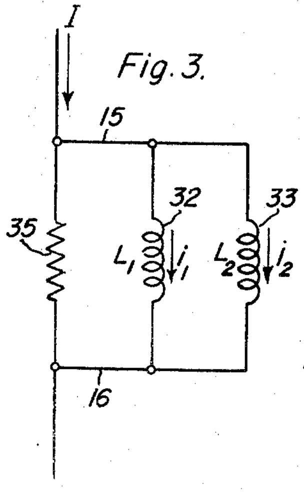
FIGURE 3 is a schematic diagram of the equivalent circuit of the single cell of FIGURE 1.
Figure 4:
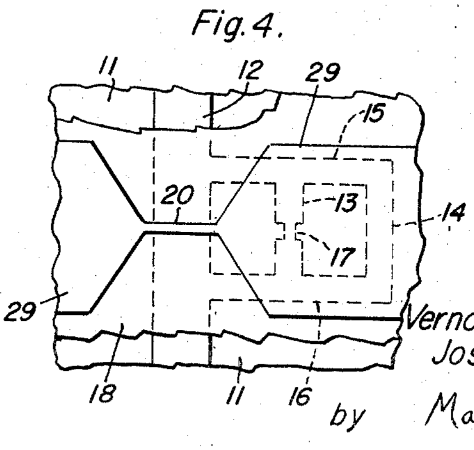
FIGURE 4 is a schematic diagram illustrating an alternate form of hard superconductor path for the cell of FIGURE 1.

Operation of the cell shown in FIGURES 1 and 2, as well as the alternative form shown in FIGURE 4, may be readily understood with the aid of the cell equivalent circuit shown in FIGURE 3 wherein leg 12 is represented as being in the normal state by a resistance 35, and legs 13 and 14 are represented as being superconducting by inductances 32 and 33 respectively. Information storage is manifested by existence of a persistent current circulating through legs 13 and 14 as shown in FIGURE 1, or through inductance 32 and 33, as shown in FIGURE 3. The contents of cell 10 of FIGURE 1 can be interrogated or changed driving current through both paths 12 and 20, or the Y and X lines respectively, of the cell. The X current, or current supplied by source 25, causes leg 12 to become resistive or normal; any current supplied by Y current source 22 while leg 12 is normal is thus injected through paths 15 and 16 into the storage loop defined by legs 13 and 14 and paths 15 and 16. Letting the values of inductances 32 and 33 in FIGURE 3 be represented by $L_1$ and $L_2$ respectively, and letting the critical currents therein, which may be defined as the minimum current amplitude required to switch the leg carrying the current out of a superconducting condition, be represented by $i_{C1}$ and $i_{C2}$ respectively, then, for an injected current I which drives neither leg resistive, current through leg 13 may be represented as (1) $$i_1=\frac{L_2}{L_1+L_2}I$$

and current through leg 14 may be represented as (2) $$i_2=\frac{L_1}{L_1+L_2}I$$

For small values of I, these magnitudes of injected current do not result in stored current. However, if I is sufficiently large so that $i_1>i_{C1}$, then (3) $$i_2=I-i_{C1}$$

and current is stored. From Equation 1, it can be seen that this happens when $I \geqslant I_{min.}$, where (4) $$I_{min.}=i_{C1}\frac{L_1+L_2}{L_2}$$

On the other hand, I is not so large that $i_2>i_{C2}$, so that leg 14 remains superconducting. This is because constricted region 17 lowers the value of $i_{C1}$. Moreover, leg 14 and paths 15 and 16 may be widened, if desired, so as to assure that $i_2<i_{C2}$ and that paths 15 and 16 remain superconducting.

To calculate the stored current which results upon switching off the injected I, the switching-off process is simulated by considering an injected current —I. From Equation 1, this injects a component $$-\frac{L_2}{L_1+L_2}I$$

into leg 13 which is already carrying current $i_{C1}$. Hence, the net current in leg 13 may be represented as (5) $$i_S=i_{C1}-\frac{L_2}{L_1+L_2}I$$

Similarly, injected current —I results in injection of a component $$-\frac{L_1}{L_1+L_2}I$$

into leg 14, which is already carrying current $i_2$. Hence the net current in leg 14 may be represented as (6) $$i_x=i_2-\frac{L_1}{L_1+L_2}I$$

Substituting the expression for $i_2$ given by Equation 3 into Equation 6, (7) $$i_x=i_{C1}+\frac{L_2}{L_1+L_2}I$$

Hence, $i_x=-i_s$, so that $i_s$ corresponds to the stored current circulating through the loop defined by legs 13 and 14 and paths 15 and 16.

Figure 5:
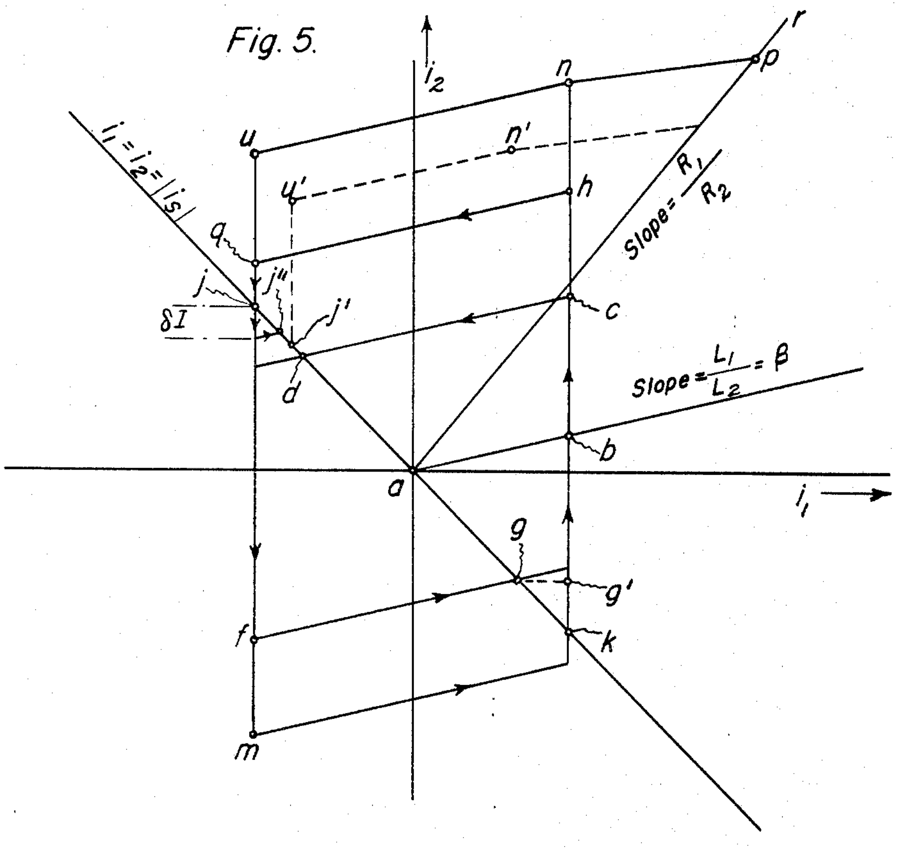
FIGURE 5 is a diagram which graphically illustrates operation of the cell of FIGURE 1.

Cell operation may be described geometrically, as in FIGURE 5, along Cartesian coordinates of $i_1$ and $i_2$. The virgin state corresponds to point *a*, at the origin. As current is injected, the operating point moves along line *ab* of slope $\beta$, where $$\beta=\frac{L_1}{L_2}$$

When the injected current is large enough to cause leg 13 to become critical, or go resistive, all further current increase occurs in leg 14, so that the cell operating point moves along line *bc*. If injected current is turned off after operating point *c* has been reached, the current distribution moves along line *cd*, which has the same slope as line *ab*. At point *d*, the injected current will have reached zero, since this point lies on the line $-i_1=i_2$ and injected current I, which is provided while leg 12 is resistive, equals $i_1+i_2$ which totals zero along line *ad*.

If the current injected into the cell is large enough to bring the cell to point *h*, then, as this current is reduced, current $i_1$ reaches the crtical value, or value at which leg 13 again becomes normal, at point $q$. However, at point $q$ the injected current is not yet zero since $-i_1+i_2\neq 0$. As the injected current is reduced further, cell operation moves from point $q$ to point $j$ where a stable circulating current of $|i_{C1}|$ is obtained. Hence, it is clear that if the peak injected current brings the cell operating point above $h$ on line $bn$, the stored current will always correspond to point $j$, where $|i_s|=i_{C1}$.

If a negative injected current should now be applied, the cell operating point will move to a new point such as $f$ or $m$ and, after the injected current has been switched off, the cell operating point will have moved to some location on line $ak$.

To get from any point, such as point $g$ along line $ak$, to another point, such as $h$, requires an injected current equal to $$I_{gh}=(i_{1_h}-i_{1_g})+(i_{2_h}-i_{2_g}) \quad (8)$$

where the subscripts applied to currents $i_1$ and $i_2$ indicate values of those currents as measured from the origin along the respective $i_1$ and $i_2$ axes a distance corresponding to the projection onto the associated axis of the point signified by the letter subscript. From FIGURE 5 it can be seen that $(i_{1_h}-i_{1_g}(=gg'$ and $(i_{2_h}-i_{2_g})=g'h$ with line $g'h$, with line $gg'$ being parallel to the $i_1$ axis and line $g'h$ being parallel to the $i_2$ axis. However, since line $ak$ is at 45 degrees to the axes, $$gg'=g'k \quad (9)$$

Thus it can be seen that the change in injected current I necessary to move the cell from operation at point $g$ to operation at point $h$, or $\Delta I_{gh}$, is the same as the change in injected current necessary to move the cell from operation at point $k$ to operation at point $h$, or $\Delta I_{kh}$. Hence, $$\Delta I_{gh}=\Delta I_{kh} \quad (10)$$

Equation 10 shows that the injected current necessary to reach any point on the vertical line $kh$ is independent of whatever stored current the cell contained initially. Therefore, Equations 4 and 5 for minimum injected current and for stored current respectively, are independent of the cell history, and any given current which is injected into either one of minor legs 13 and 14 of cell 10 in FIGURE 1 is also injected, with opposite polarity, into the other one of the minor legs. Thus, with this cell, the injected current required to store any given amount of current is independent of cell history.

In event the injected current I should be increased beyond the value $I_R$, where $$I_R=i_{C1}+i_{C2} \quad (11)$$

both legs 13 and 14 of cell 10 will become resistive, or normal. Under these conditions, the cell operating point moves along a line such as $np$, representing a transition state between superconducting and resistive for legs 13 and 14. At point $p$, both legs 13 and 14 are fully resistive. Any further increase of injected current then moves the operating point along line $pr$, which has a slope equal to the ratio of normal state resistances of legs 13 and 14, $R_1$ and $R_2$ respectively. In general, $$\frac{R_1}{R_2}\neq\frac{L_1}{L_2}$$

As the injected current is reduced, the operating point moves back along lines $rp$ and $pn$ to point $n$ where both legs 13 and 14 carry critical currents. Further reduction of injected current I causes the operating point to move along line $nu$ and, when current I reaches zero, the equilibrium position is at point $j$ as before. Hence, the stored current is independent of the magnitude of injected current I, provided that Joule heating is negligible.

When injected current I is so large that both legs 13 and 14 of cell 10 are resistive, Joule heating will occur. This may raise the cell temperature, reducing $i_{C1}$ and $i_{C2}$. If point $n'$ be assumed to correspond to these reduced critical currents, then when current I is switched off the operating point moves along path $n'u'j'$, resulting in a reduced stored current. Joule heating, however, can be reduced by making the soft superconductor film thick and/or by keeping the injected current pulse very short.

The only limitation on the maximum value of injected current I is that of Joule heating, so that the cell, theoretically, has an infinite operating range. In practice, it is often convenient to operate the cell so that current $i_2$ never reaches the critical value. In such case, the allowable upper limit of current I is given by Equation 11. The corresponding operating range $\Omega$ of the cell may be defined as $$\Omega=\frac{I_R-I_{min.}}{I_R+I_{min.}} \quad (12)$$

where $I_{min.}$ is given by Equation 4 and corresponds to the minimum injected current which produces a stored current. From Equations 4, 11 and 12

$$\Omega=\frac{i_{C1}+i_{C2}-i_{C1}\left(\frac{L_1+L_2}{L_2}\right)}{i_{C1}+i_{C2}-i_{C1}\left(\frac{L_1+L_2}{L_2}\right)}$$

$$=\frac{\frac{i_{C2}}{i_{C1}}-\frac{L_1}{L_2}}{\frac{i_{C2}}{i_{C1}}+2+\frac{L_1}{L_2}} \quad (13)$$

From Equation 12 it can be seen that the maximum operating range $\Omega$ of the cell, with current $i_2<i_{C2}$, is unity. Equation 13 shows that this value of $\Omega$ is approached for $$\frac{i_{C2}}{i_{C1}}\gg 1 \text{ and } \frac{L_1}{L_2}\ll 1$$

Figure 6:
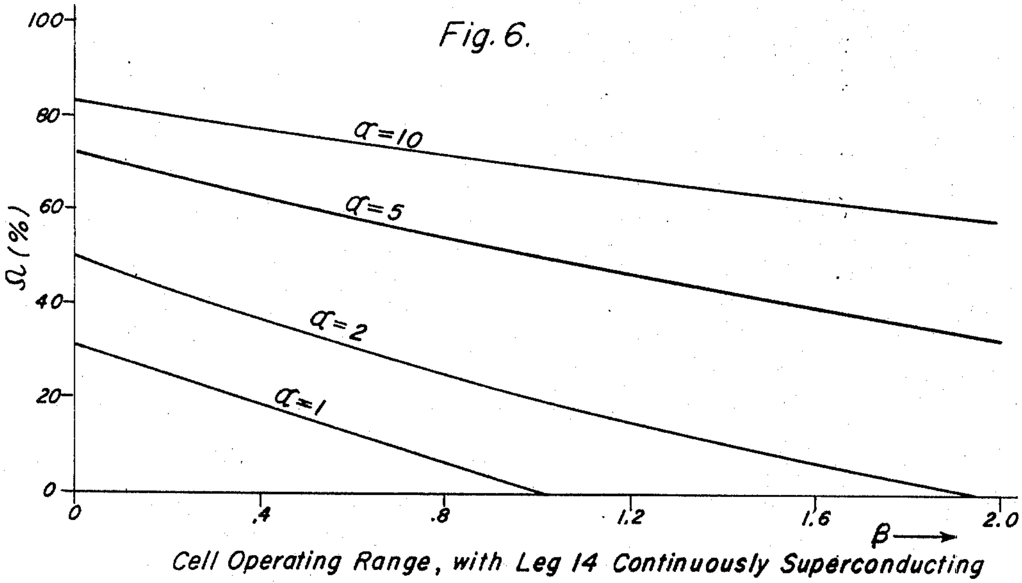
FIGURE 6 is a diagram to aid in explaining operation of the cell of FIGURE 1.

FIGURE 6 is a plot of variations in $\Omega$ at different values of $\alpha$, where $$\alpha=\frac{i_{C2}}{i_{C1}}$$

for variations in $\beta$. Thus, for $\alpha\geqslant 5$, $\Omega$ is above 45 percent for any value of $\beta$ between 0 and 1. Since $$\beta=\frac{L_1}{L_2}$$

$L_2$ can be made as small as $L_1$ without much sacrifice in operating range.

The fact that a large $\Omega$ is obtained by keeping $i_{C2}/i_{C1}$ large and $L_1/L_2$ small explains the configuration of leg 13 shown in FIGURE 1. By constricting leg 13 in region 17, critical current therein is correspondingly restricted, making $i_{C2}/i_{C1}$ large. However, because a narrow film has a relatively high inductance, constricted region 17 is made as short as possible so as to keep the ratio $L_1/L_2$ small. Leg 12 is made relatively wide to ensure that when the X line is not activated, very little Y current is injected into the cell but instead passes directly through major leg 12.

The amount of Y current which in injected into an unselected cell is $$\frac{IL_3}{\frac{L_1L_2}{L_1+L_2}+L_3}$$

where $L_3$ represents the inductance of leg 12 when in the superconducting state. As long as this current is kept small with respect to current $i_s$, the cell contents are not appreciably degraded. The effect of a small injected current $\delta I$ on a cell at point $j$, as shown in FIGURE 5, changes the stored state from $j$ to $j''$. Further injections of $\delta I$, in either direction, will not cause any further changes in the stored current. However, to ensure that in any array of cells these changes do not combine additively so as to produce a significant signal in the output amplifier, it may be desirable, after a cell has been switched, to apply a single Y-line degradation current pulse in a direction opposite to that used to switch the cell.

Figure 7:
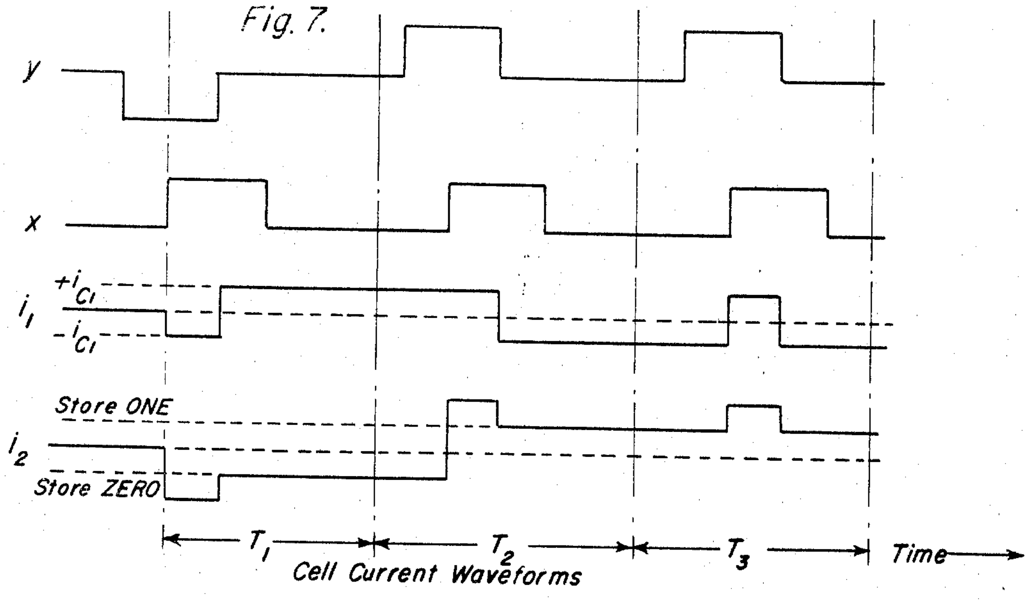
FIGURE 7 is a waveform diagram used to illustrate operation of the cell of FIGURE 1.

Current waveforms illustrating operation of the cell are shown in FIGURE 7. The cell is sensed by destructive readout, using the method designated "current stretching" as described in the aforementioned Newhouse et al. application Ser. No. 600,895. To store a persistent current in the cell, simultaneous current pulses are applied to the relevant X and Y lines as shown in time period $T_1$ of FIGURE 7. This results in storage of current in the cell, as shown by the $i_1$ and $i_2$ waveforms. It should be noted that the X current is maintained after the Y current ceases, to avoid current storage in leg 12 of cell 10 shown in FIGURE 1. The X and Y current pulses applied during period $T_2$ invert the stored current, as shown by the $i_1$ and $i_2$ waveforms. If desired, this procedure could be used for sensing, by detecting whether or not a current reversal has occurred.

Figure 8:
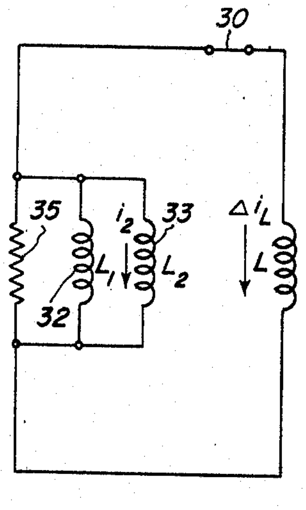
FIGURE 8 is a schematic diagram of the equivalent circuit of the single cell of FIGURE 1 when in the process of being read out.

The current-stretch sense circuit may be readily understood by referring to the equivalent circuit of FIGURE 8, in which inductance L represents total readout loop inductance including the input impedance of amplifier 28 of FIGURE 1. If leg 14 remains superconducting throughout a switching process in which the current therethrough changes by $\Delta i_2$, then, since flux is conserved in any superconducting loop, as is well-known in the art, $$L_2\Delta i_2-(L-L_2)\Delta i_L=0$$

where $\Delta i_L$ is the sensed current. That is, $$\Delta i_L=\Delta i_2 \frac{L_2}{L-L_2}$$

Thus, the current sensed by current stretch amplifier 28 of FIGURE 1 follows changes in current $i_2$. Therefore, to sense the contents of a cell, reset cryotron 30 is switched from its resistive to its superconducting condition, and a binary ONE is written into the cell in the manner illustrated by the X and Y currents in time period $T_2$ of FIGURE 7. Current $i_L$ is monitored through the reset cryotron, which now presents zero impedance. A change in current $i_L$ indicates that the cell contents have been changed; that is, that the cell contained a binary ZERO before the ONE was written. Although if only one cell were sensed by the current stretch amplifier the absolute value of current $i_L$ could be used as a permanent indication of cell contents, this is not practicable where the same amplifier is used to sense many different cells at different times.

The changes which occur in current $i_2$ when cell contents are changed are illustrated in time period $T_2$ of FIGURE 7. During periods $T_2$ and $T_3$, two successive positive Y current pulses are applied so that no permanent change in cell persistent stored current occurs as a result of the second positive Y pulse, although there is a temporary change in current $i_2$. By strobing the current stretch amplifier so that the amplifier is rendered sensitive only after lapse of sufficient time for such current change to have subsided, this type of temporary change in current $i_2$ is prevented from becoming erroneously sensed as a change in cell contents.

Figure 9:
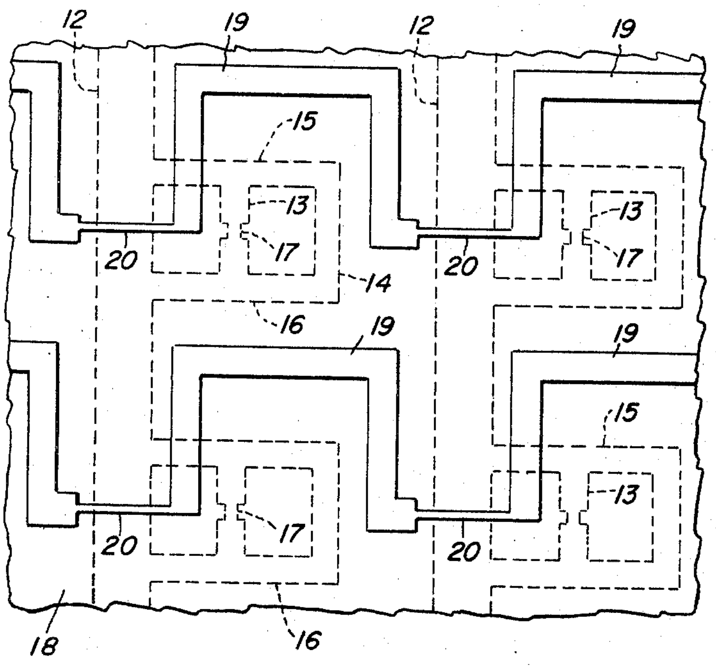
FIGURE 9 is a top view illustration of a plurality of cells such as shown in FIGURE 1, arranged in a planar array.

FIGURE 9 illustrates a portion of a planar array comprising a plurality of cells such as shown in FIGURES 1 and 2, with like numerals indicating like structural components. Such array can be fabricated in the manner described for a single cell, with large numbers of each component being produced simultaneously. The entire array may thereafter be covered with a layer of insulation, if desired. Sensing is typically accomplished with a single amplifier through a cryotron tree which connects the amplifier to selected Y lines in a bit-organized array, in the manner described in the aforementioned Newhouse et al. application Ser. No. 600,895. Another advantage to an array of this type is that it permits high stacking density, due to its low thickness, so that a large number of cells may be fitted into a small volume of space.

The foregoing describes a persistent current cryogenic storage cell having an operating range which may be made indefinitely large by increasing cell dimensions. The cell, which is completely immune to half-select disturbances, is characterized by simple construction and ease of fabrication.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

We claim:

1. A cryogenic storage device comprising: a major path and two minor paths of soft superconductive material, said minor paths being directed in parallel with said major path and connected thereto through a pair of common linking paths comprised of said soft superconductive material; a single control electrode of hard superconductive material regulating the switching characteristics of said entire device by control of the superconductive state of only said major path, said control electrode being directed so as to crossover said major path of soft superconductive material at substantially a right angle thereto, said control electrode of hard superconductive material being relatively narrow at the crossover of said major path and relatively wide elsewhere so as to facilitate establishment of a stronger magnetic field through said soft superconductive material at the crossover of said major path than at any other location; means for passing a current pulse through said major path, means connected to said control electrode for switching a section of said major path to a normal state to divert said current pulse through said minor paths, said current pulse being of a magnitude to produce current flow through one of said minor paths in a magnitude at least equal to the critical current of said one path to store current in said minor paths independently of said major path and insulating means spacing the control electrode of hard superconductive material from the path of soft superconductive material so as to keep the path of soft superconductive material electrically isolated from said control electrode.

2. The cryogenic storage device of claim 1 wherein at least a short portion of the length of one of said two minor paths is narrower than any portion of the length of the other of said two minor paths so as to lower the critical current of said one of said two minor paths substantially below the critical current of the other of said two minor paths.

3. The cryogenic storage device of claim 1 including a uniform film of lead underlying said paths of soft superconductive material, and additional insulating means spacing said uniform film of lead from said paths of soft superconductive material.

4. The cryogenic storage device of claim 1 wherein said soft superconductive material comprises one of the group consisting of tin and indium, and said hard superconductive material comprises one of the group consisting of lead and niobium.

5. The cryogenic storage device of claim 3 wherein said soft superconductive material comprises one of the group consisting of tin and indium, and said hard superconductive material comprises one of the group consisting of lead and niobium.

6. A cryogenic storage cell comprising: a major path and two minor paths of soft superconductive material, said minor paths being directed in parallel with said major path and connected thereto through a pair of common linking paths comprised of said soft superconductive material; a single control electrode of hard superconductive material regulating the switching characteristics of said entire cell by control of the superconductive state of only said major path, said control electrode being directed so as to cross over said major path at substantially a right angle thereto and to cross over one of said linking paths at a location between said major path and the closer of said two minor paths, said control electrode of hard superconductive material being relatively narrow at the crossover of said major path and relatively wide at the crossover of said one linking path so as to facilitate establishment of a stronger magnetic field through said superconductive material at the crossover of said major path than at the crossover of said one linking path; and insulating means spacing the control electrode of hard superconductive material from the path of soft superconductive material at each of said crossovers so as to keep the path of soft superconductive material electrically isolated from said control electrode.

7. The cryogenic storage cell of claim 6 wherein at least a short portion of the length of one of said two minor paths is narrower than any portion of the length of the other of said two minor paths so as to lower the critical current of said one of said two minor paths substantially below the critical current of the other of said two minor paths.

8. The cryogenic storage cell of claim 7 wherein said soft superconductive material comprises one of the group consisting of tin and indium, and said hard superconductive material comprises lead.

9. The cryogenic storage cell of claim 7 including a uniform film of said hard superconductive material underlying said paths of soft superconductive material, and additional insulating means spacing said uniform film of hard superconductive material from said paths of soft superconductive material.

10. A planar array of rows and columns of cryogenic devices, each said device comprising the cell of claim 7, wherein said major path of a soft superconductive material in each cell of each respective column is formed integrally with said major path of soft superconductive material of each adjacent cell in said respective column, and said control electrode of hard superconductive material in each cell of each respective row is formed integrally with said control electrode of hard superconductive material of each adjacent cell in said respective row.

11. The planar array of claim 10 including a uniform sheet of hard superconductive material underlying said rows and columns, and additional insulating means spacing said uniform sheet of hard superconductive material from each of the cells in said array.

12. A cryogenic device according to claim 1 wherein said major path is of an enlarged cross-sectional area relative to said minor paths to limit current flow from said major path through said minor paths to a magnitude insufficient to store current in said minor paths during superconductive operation of said major path.

13. The cryogenic storage device of claim 1 wherein the stored current in said minor paths is equal to the critical current of one of said minor paths wherein said current is stored.

14. The cryogenic storage device of claim 1 including means for passing a current pulse from said major path to said minor paths to readout the presence of stored current therein.

15. The cryogenic storage device of claim 14 wherein said readout pulse is of a polarity opposite the polarity of the current pulse producing stored current in said minor paths.

16. A cryogenic storage device according to claim 1 wherein said major path is switched to a normal state for a period extending beyond the applied period of the current pulse storing current in said minor paths.

17. A cryogenic storage device according to claim 1 further including means for applying a degradation current pulse to said major path subsequent to the applied period of the current pulse storing current in said minor paths.

References Cited

UNITED STATES PATENTS

| | | | |
|---|---|---|---|
| 3,191,160 | 6/1965 | Alphonse | 340—173.1 |
| 3,207,921 | 9/1965 | Ahrons | 340—173.1 |
| 3,402,400 | 9/1968 | Sass | 340—173.1 |

TERRELL W. FEARS, Primary Examiner

U.S. Cl. X.R.

307—238